(12) United States Patent
Ebrahimi Jouzdani et al.

(10) Patent No.: US 12,726,134 B2
(45) Date of Patent: Sep. 1, 2026

(54) FIVE LEVEL HYBRID ACTIVE CLAMPED DC-AC CONVERTER

(71) Applicant: Queen's University at Kingston, Kingston (CA)

(72) Inventors: Javad Ebrahimi Jouzdani, Kingston (CA); Alireza Bakhshai, Kingston (CA)

(73) Assignee: Queen's University at Kingston, Kingston (CA)

( * ) Notice: Subject to any disclaimer, the term of this patent is extended or adjusted under 35 U.S.C. 154(b) by 182 days.

(21) Appl. No.: 18/631,835

(22) Filed: Apr. 10, 2024

(65) Prior Publication Data

US 2024/0348179 A1 Oct. 17, 2024

Related U.S. Application Data

(60) Provisional application No. 63/459,293, filed on Apr. 14, 2023.

(51) Int. Cl.

*H02M 1/00* (2007.01)
*H02M 7/483* (2007.01)
*H02M 7/537* (2006.01)

(52) U.S. Cl.

CPC ....... *H02M 7/4835* (2021.05); *H02M 1/0095* (2021.05); *H02M 7/537* (2013.01)

(58) Field of Classification Search

CPC .... H02M 7/487; H02M 7/483; H02M 7/4837; H02M 7/4833; H02M 7/5395; H02M 7/49; H02M 7/53876; H02M 7/4835; H02M 7/537; H02M 7/501; H02M 7/538; H02M 7/53873; H02M 5/4585; H02M 5/4505; H02M 1/0095; H02M 1/0003; H02M 1/42

See application file for complete search history.

(56) References Cited

U.S. PATENT DOCUMENTS 7,180,270 B2 * 2/2007 Rufer ........................ H02P 9/30 290/44
2015/0200602 A1 * 7/2015 Narimani ............ H02M 5/4585 363/37

FOREIGN PATENT DOCUMENTS

AU 2015414494 A1 * 5/2018 .......... H02M 7/4835

OTHER PUBLICATIONS

AU 2015414494 A1 Translation (Year: 2015).*
Narimani, M. et al., "A Novel and Simple Single-Phase Modulator for the Nested Neutral-Point Clamped (NNPC) Converter", IEEE Transactions on Power Electronics, vol. 30, No. 8, 2015, pp. 4069-4078.
Wang, K. et al.. "Voltage Balancing Control of a Four-Level Hybrid-Clamped Converter Based on Zero-Sequence Voltage Injection Using Phase-Shifted PWM", IEEE Transactions on Power Electronics, vol. 31, No. 8, 2016, pp. 5389-5399.

* cited by examiner

*Primary Examiner* — Bryan R Perez
(74) *Attorney, Agent, or Firm* — Stephen J. Scribner

(57) ABSTRACT

Five-level hybrid active clamped converters provide improved performance and switching device utilization over conventional five-level active neutral point clamped converters. Topologies include increased dc-link voltage relative to active neutral point clamped designs and enable capacitor voltage balancing, and are suitable for next generation high-power DC to AC converters, such as in photovoltaic applications, in both single phase and three phase configurations.

15 Claims, 10 Drawing Sheets

FIVE LEVEL HYBRID ACTIVE CLAMPED DC-AC CONVERTER

RELATED APPLICATION

This application claims the benefit of the filing date of Application No. 63/459,293, filed on Apr. 14, 2023, the contents of which are incorporated herein by reference in their entirety.

FIELD

The invention relates generally to the field of DC-AC voltage converters. More specifically, the invention relates to five-level hybrid active clamped converters with improved performance and switching device utilization over conventional five-level active neutral point clamped converters.

BACKGROUND

Renewable power generation such as photovoltaic systems and most wind turbines generate DC voltages. Battery energy storage systems are widely used to store the energy in the form of DC. In wind power generation systems the output voltage of the wind turbine may be rectified to a DC link. To connect these renewable energy sources to the AC grid, the DC voltage must be converted to AC voltage. This is typically achieved using DC-AC grid-tie converters. The size and the power rating of wind turbines is increasing dramatically to reduce the cost of energy per produced kilowatt hour. In addition, an increase in the size of the photovoltaic array connected to a DC-AC converter unit, with almost no additional complexity in the power electronics circuitry and infrastructure of the unit, generally helps effect better efficiency, lower cost, and better reliability in the converter. Therefore, the industry continues to drive technological advances to increase the power capability for such high-power solar and wind renewal energy applications in the several megawatt range. However, achieving this requires the development of newer and innovative circuit topologies and switching schemes that can allow the use of new semiconductor switching devices at a higher DC bus voltage. Developing such efficient, low cost, low volume, medium-voltage high-power DC/AC grid-tie converters is an emerging need to develop centralized renewable resources. A higher DC bus voltage not only enables the converter to transfer more power, but it enables more renewable sources to be handled by the same converter. Considering the voltage/current limits of existing power semiconductors switching devices, traditional two-level converters are reaching the upper limits of either the current or voltage ratings of the power switching devices. Multilevel converters represent a possible solution to overcome the voltage and current limits of the power semiconductors, but there are design challenges to their implementation.

SUMMARY

According to one aspect of the invention there is provided a five-level DC-AC converter, comprising: a positive DC voltage input point; a negative DC voltage input point; a circuit comprising three capacitors C1, C2, C3 connected across the positive and negative DC input points, wherein a first dc-link voltage is provided at a connection between the capacitors C1 and C2 and the positive DC voltage input point, and a second dc-link voltage is provided at a connection between the capacitors C2 and C3 and the negative DC voltage input point; a first circuit connected across the first dc-link voltage comprising a switch Sla and a switch S1*na* connected together at a first common point; a second circuit connected across the second dc-link voltage comprising a switch S2*a* and a switch S2*na* connected together at a second common point; a third circuit connected across the first common point and the second common point; wherein the third circuit comprises: six switches S3*a*, S4*a*, S5*a*, S4*na*, S5*na*, and S3*na* connected together; at least first and second flying capacitors C1*a* and C2*a* connected together across a connection point between switches S3*a* and S4*a* and a connection point between switches S5*na* and S3*na*; at least first and second diodes D1 and D2 connected together across a connection point between switches S4*a* and S5*a* and a connection point between switches S4*na* and S5*na*; a common point between first and second flying capacitors C1*a* and C2*a* connected to a common point between diodes D1 and D2; and an output point between switches S5*a* and S4*na* that outputs five voltage levels.

In one embodiment a blocking voltage of each switch is substantially the same.

In one embodiment a blocking voltage of each switch is approximately Vdc/4.

In one embodiment capacitor voltage is substantially balanced across all operating points of the converter.

In one embodiment the capacitors C1 and C3 are substantially the same value and the capacitor C2 is of a smaller value than C1 or C3.

In one embodiment the converter comprises a controller that generates switching signals for switches of the DC-AC converter; wherein the switching signals control switching states of the switches to regulate capacitor voltages under all operating conditions of the DC-AC converter and to generate the five output voltage levels.

In one embodiment the controller implements a space vector modulation control technique.

In one embodiment the switching states include redundant switching states.

In one embodiment the converter is implemented in a DC-AC grid-tie converter.

According to another aspect of the invention there is provided a DC-AC grid-tie converter comprising a five-level DC-AC converter as described herein.

According to another aspect of the invention there is provided a three-phase five-level DC-AC converter, comprising: a positive DC voltage input point; a negative DC voltage input point; a circuit comprising three capacitors C1, C2, C3 connected across the positive and negative DC input points, wherein a first dc-link voltage is provided at a connection between the capacitors C1 and C2 and the positive DC voltage input point, and a second dc-link voltage is provided at a connection between the capacitors C2 and C3 and the negative DC voltage input point;

wherein each phase of the three-phase converter comprises:

a first circuit connected across the first dc-link voltage comprising a switch S1*a* and a switch S1*na* connected together at a first common point; a second circuit connected across the second dc-link voltage comprising a switch S2*a* and a switch S2*na* connected together at a second common point; a third circuit connected across the first common point and the second common point; wherein the third circuit comprises: six switches S3*a*, S4*a*, S5*a*, S4*na*, S5*na*, and S3*na* connected together; at least first and second flying capacitors C1*a* and C2*a* connected together across a connection point between switches S3*a* and S4*a* and a connection point between switches S5_na_ and S3_na_; at least first and second diodes D1 and D2 connected together across a connection point between switches S4_a_ and S5_a_ and a connection point between switches S4_na_ and S5_na_; a common point between first and second flying capacitors C1_a_ and C2_a_ connected to a common point between diodes D1 and D2; and an output point between switches S5_a_ and S4_na_ that outputs five voltage levels corresponding to one of the three phases.

According to another aspect of the invention there is provided a DC-AC grid-tie converter comprising a five-level three-phase DC-AC converter as described herein.

According to another aspect of the invention there is provided a method for operating a five-level DC-AC converter as described herein, comprising using space vector modulation.

According to another aspect of the invention there is provided a method for operating a three-phase five-level DC-AC converter as described herein, comprising using space vector modulation.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Described herein are five-level DC-AC converters suitable for high-power applications such as inverters in wind and solar (photovoltaic) power generation. A DC-AC converter may also be referred to herein as an inverter. The converters, referred to herein as five-level hybrid active clamped (5L-HAC) topology, generate a five-level voltage waveform at output, resulting in low distortion. Hybrid-clamped multi-level converters utilize split dc-link and flying capacitors to generate the output voltage levels. Embodiments provide high-voltage high-power converters that benefit from design features that provide dc-link capacitor and flying capacitor voltage balancing, optionally using a conventional space vector modulation strategy. Features may include one or more of:

- No need for series-connected switching devices to achieve a high dc-link voltage. According to embodiments, the dc-link voltage is substantially increased relative to prior designs, which is a requirement for next generation high-power dc to ac converters, particularly for photovoltaic applications.
- Same blocking voltage for all switching devices.
- Lower number of switching devices.
- Much smaller capacitors due to lower voltage ripple and lower capacitors volt-ampere.
- Simple hardware design and packaging.
- Lower cost, volume, and weight.
- Better thermal distribution.
- Higher efficiency.

Embodiments are therefore a significant advance over prior five level converter topologies, such as five-level active neutral point clamped (5L-ANPC) converters, and provide improved five-level topology for high-power single phase and three phase multilevel hybrid converters that overcome the design challenges that have limited the use of prior five-level topologies.

Topology

Embodiments may be implemented with insulated gate bipolar transistors (IGBTs) as the power switching devices, or other types of power switching devices, such as MOSFETs.

Figure 1:
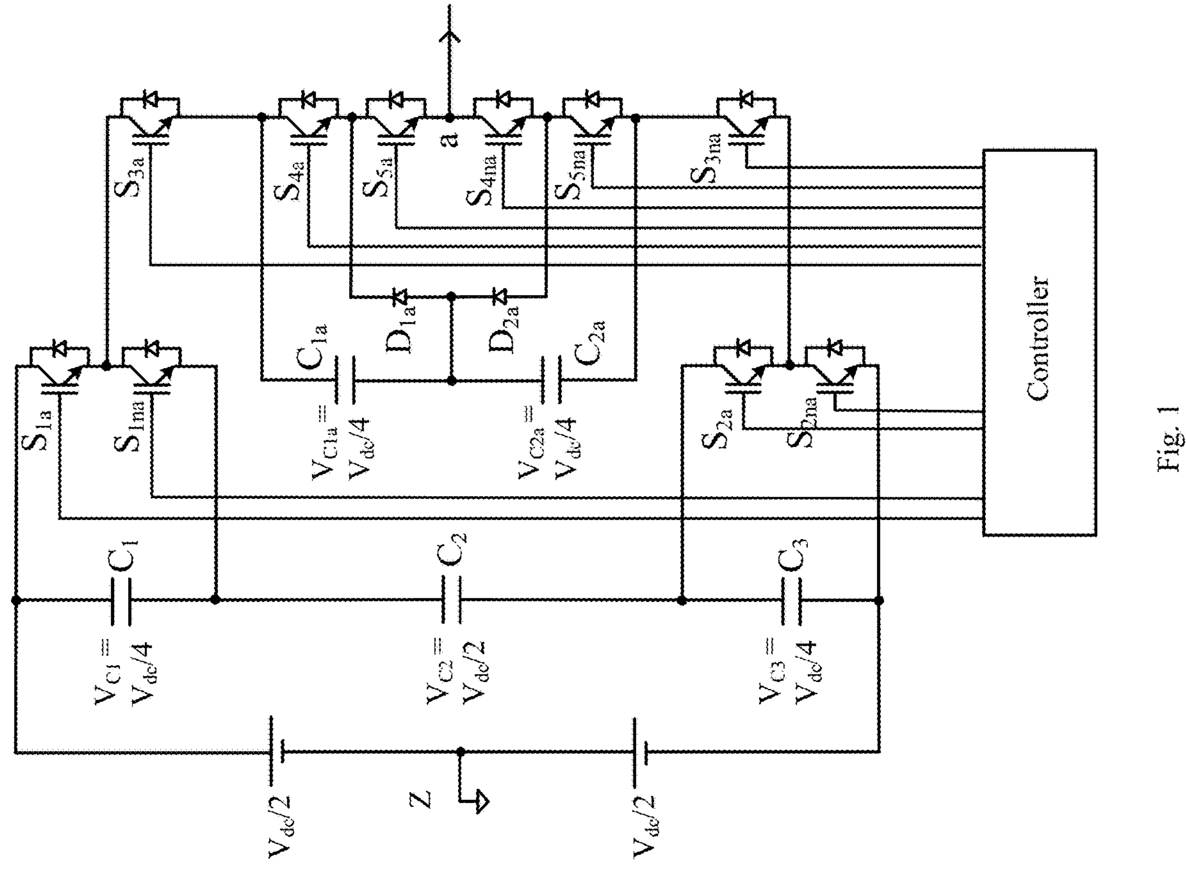
FIG. 1 is a schematic diagram of a hybrid five-level single-phase inverter topology, according to one embodiment.

A single phase embodiment is shown in FIG. 1. Referring to FIG. 1, a DC voltage Vdc is connected to positive and negative DC voltage input points. In the figure, Z is shown as representing the midpoint of the input DC voltage. Three capacitors C1, C2, C3 are connected across the DC input points, wherein a first dc-link voltage is provided at a connection between the capacitors C1 and C2 and the positive DC voltage input point, and a second dc-link voltage is provided at a connection between the capacitors C2 and C3 and the negative DC voltage input point. A first circuit connected across the first dc-link voltage includes switches S1_a_ and S1_na_ connected together at a first common point, and a second circuit connected across the second dc-link voltage includes switches S2_a_ and S2_na_ connected together at a second common point. A third circuit is connected across the first common point and the second common point, wherein the third circuit includes six switches S3_a_, S4_a_, S5_a_, S4_na_, S5_na_, and S3_na_ connected together, at least first and second flying capacitors C1_a_ and C2_a_ connected together across a connection point between switches S3_a_ and S4_a_ and a connection point between switches S5_na_ and S3_na_, and at least first and second diodes D1 and D2 connected together across a connection point between switches S4_a_ and S5_a_ and a connection point between switches S4_na_ and S5_na_. A common point between first and second flying capacitors C1_a_ and C2_a_ is connected to a common point between diodes D1 and D2. The converter output point a is at the connection between switches S5_a_ and S4_na_. The control terminal of each switch is connected to a controller that provides the switching signals.

Figure 2:
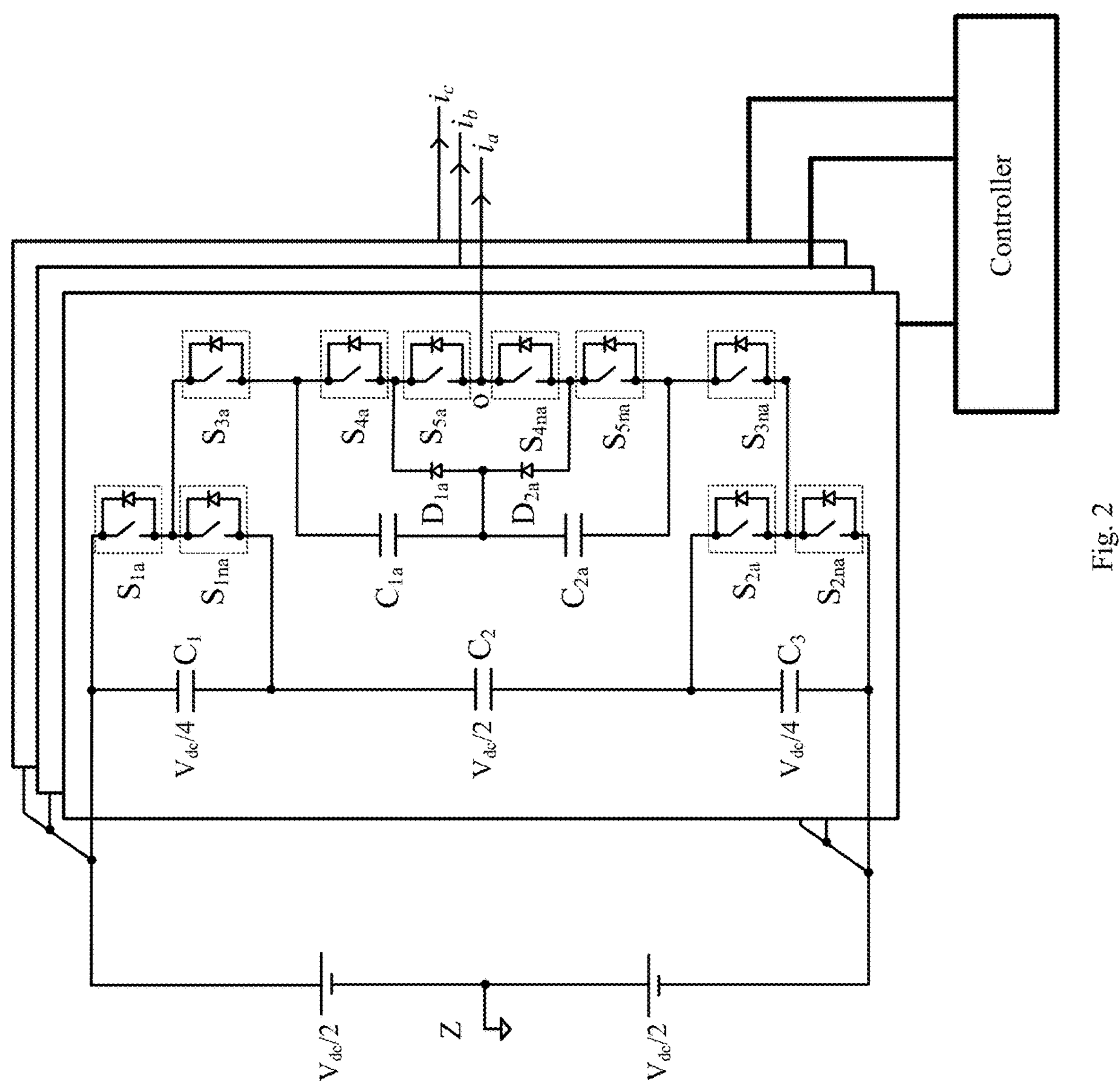
FIG. 2 is a schematic diagram of a hybrid five-level three-phase inverter topology, according to one embodiment.
Figure 3:
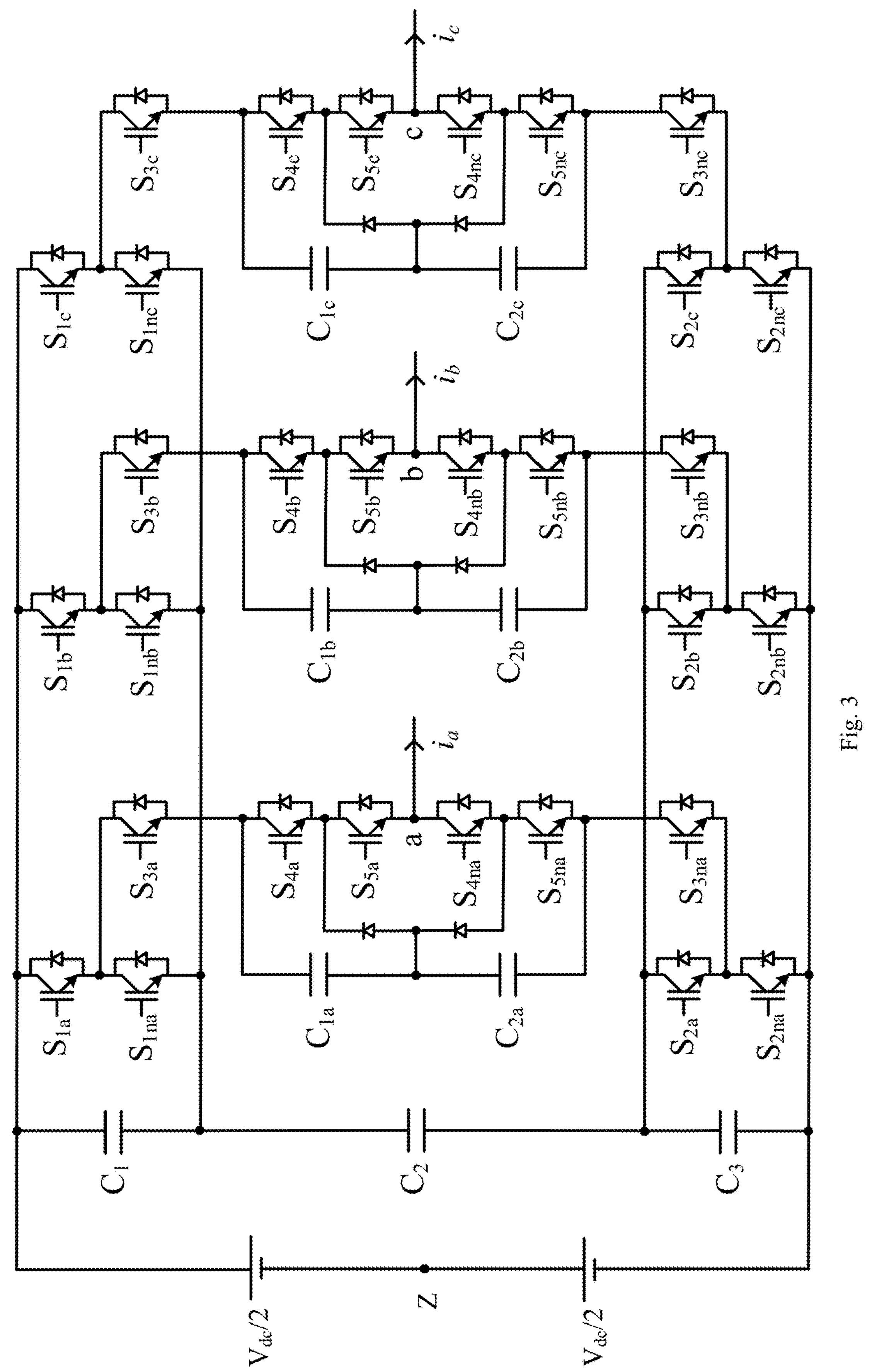
FIG. 3 is a schematic diagram of a hybrid five-level three-phase inverter topology, according to one embodiment.

Three-phase embodiments may be implemented using the topology of FIG. 1 for each phase connected in parallel across the Dc voltage input points, with the appropriate control strategy. A generalized three-phase embodiment is shown in FIG. 2, and a detailed circuit diagram of an embodiment is shown in FIG. 3.

Advantages of the topology include:

- The blocking voltage of each switch is $V_{dc}/4$. Thus a high bus voltage can be used without the need to employ series switches that would increase the complexity and reduce the reliability of converter.
- The number of switches is lower than that of an active neutral point clamped (ANPC) topology.
- Four quadrant operation.
- Covers a full range of power factor, both leading and lagging.

Table 1 shows different switching states and corresponding voltage levels and charging states of the flying capacitors according to an embodiment. The switching states and corresponding voltage levels and charging states are inherent features of the topology and independent of control/modulation strategy. As can be seen from the second and third column, there are five output voltage levels approximately equal to $0.5V_{dc}$, $0.25V_{dc}$, 0, $-0.25V_{dc}$, and $-0.5V_{dc}$ with respect to the midpoint de link voltage bus. The first column shows different switching states corresponding to each level. As can be seen, there are redundant switching states for voltage levels 1, 2 and 3. Levels 0 and 4 are synthesized by a unique switching state (no redundancy). Table 1 also shows the charging/discharging states of the two flying capacitors C1*a* and C2*a* in each switching state.

TABLE 1

Converter switching states and contribution of the AC side currents to the flying capacitor voltages

| Switching State Name | Level Number | Midpoint voltage $V_{xZ}$ | $S_{1x}$ | $S_{2x}$ | $S_{3x}$ | $S_{4x}$ | $S_{5x}$ | $V_{C1x}$ | $V_{C2x}$ |
|---|---|---|---|---|---|---|---|---|---|
| $L_4$ | 4 | 0.5 $V_{dc}$ | 1 | 1 | 1 | 1 | 1 | N | N |
| $L_{3,3}$ | 3 | 0.25 $V_{dc}$ | 0 | 0 | 1 | 1 | 1 | N | N |
| $L_{3,2}$ | | | 1 | 0 | 1 | 0 | 1 | C ($i_x > 0$)<br>D ($i_x < 0$) | N |
| $L_{3,1}$ | | | 1 | 1 | 0 | 1 | 1 | D ($i_x > 0$)<br>C ($i_x < 0$) | D ($i_x > 0$)<br>C ($i_x < 0$) |
| $L_{2,3}$ | 2 | 0 | 0 | 0 | 1 | 0 | 1 | C ($i_x > 0$)<br>D ($i_x < 0$) | |
| $L_{2,2}$ | | | 1 | 1 | 0 | 0 | 1 | N | D ($i_x > 0$)<br>C ($i_x < 0$) |
| $L_{2,1}$ | | | 1 | 0 | 0 | 1 | 1 | D ($i_x > 0$)<br>C ($i_x < 0$) | D ($i_x > 0$)<br>C ($i_x < 0$) |
| $L_{1,3}$ | 1 | −0.25 $V_{dc}$ | 1 | 1 | 0 | 0 | 0 | N | N |
| $L_{1,2}$ | | | 1 | 0 | 0 | 0 | 1 | N | D ($i_x > 0$)<br>C ($i_x < 0$) |
| $L_{1,1}$ | | | 0 | 1 | 1 | 0 | 0 | C ($i_x > 0$)<br>D ($i_x < 0$) | C ($i_x > 0$)<br>D ($i_x < 0$) |
| $L_0$ | 0 | −0.5 $V_{dc}$ | 0 | 0 | 0 | 0 | 0 | N | N |

C: Charging
D: Discharging
N: No Change,
x = a, b, c

The embodiment has redundant switching states to generate output voltage levels 0.25 Vdc, 0, and −0.25 Vdc. Each redundant switching state provides a different charging and discharging current path for the flying capacitors and the de link split capacitors. This feature may be used to achieve voltage balancing of the flying capacitors and split capacitors.

As an example, with currently available 1200V SiC switches, an embodiment with a dc bus voltage of 3600V may be implemented using a topology as described herein, where the blocking voltage across each switch is Vdc/4. Note that 1200V SiC switches are considered to operate at 900 V blocking voltage. In a conventional 5L-ANPC topology, however, the blocking voltage across switches is either $V_{dc}/2$ or $V_{dc}/4$ and thus the same switches with 900V blocking voltage limit cannot be used. As a result, a 5L-ANPC converter with a 3600V dc bus voltage would require switches with a higher voltage rating, which are more expensive. Thus, compared to a 5L-ANPC topology, embodiments described herein enable doubling of the dc bus voltage using the same switches, which increases the power transfer capability of the converter by a factor of two.

Controller

Figure 4A:
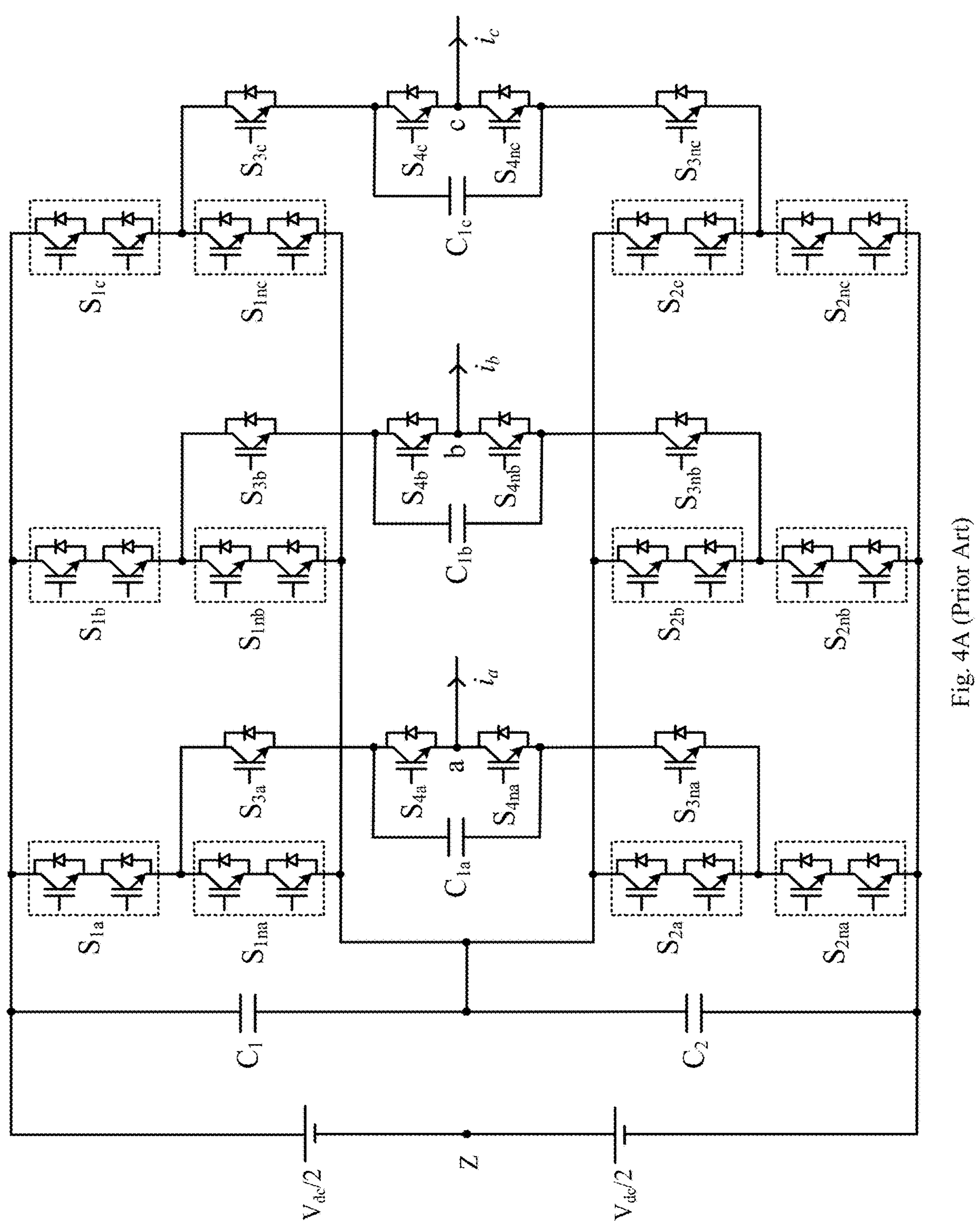
FIG. 4A is a schematic diagram of a three-phase five-level active neutral point clamed (5L-ANPC) inverter topology, according to the prior art.
Figure 4B:
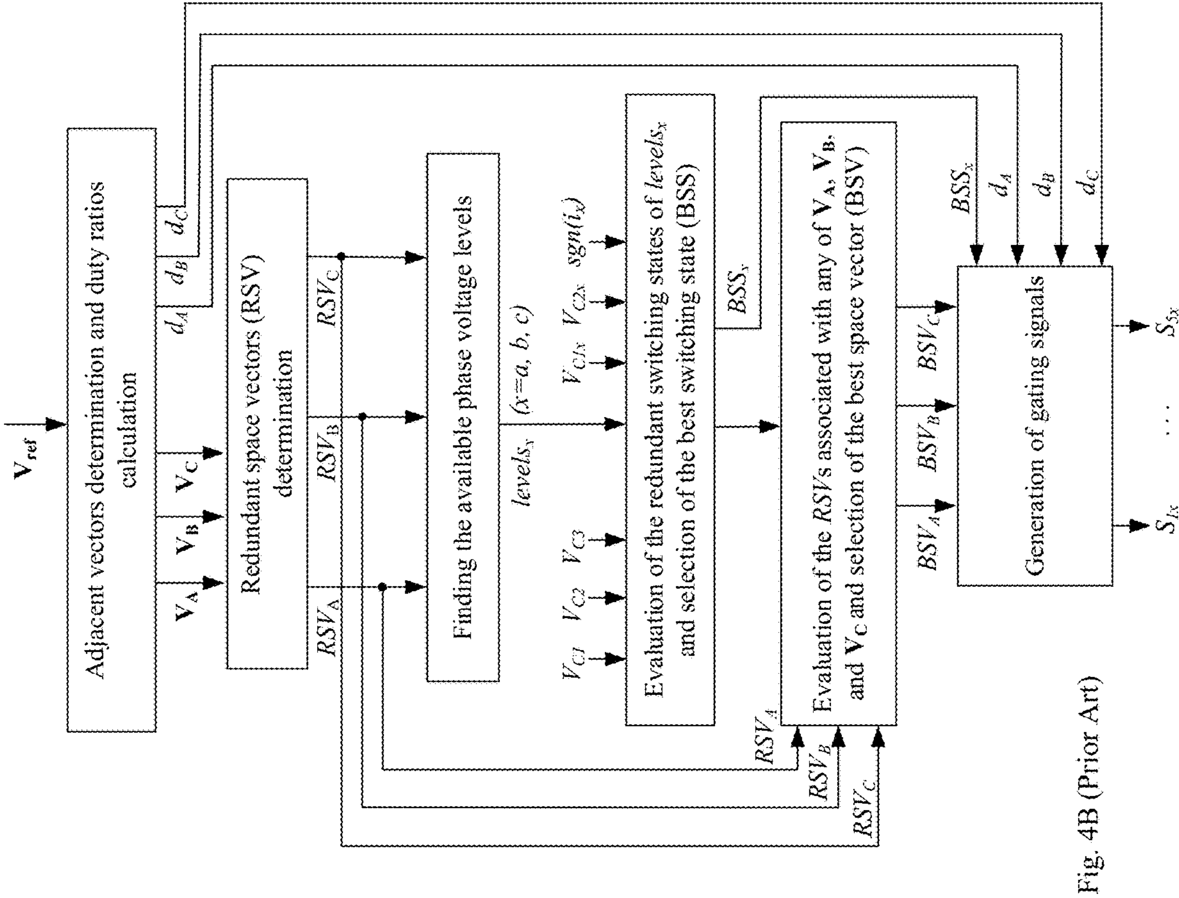
FIG. 4B is a flow diagram showing a space vector modulation (SVM) control technique with a capacitor voltage balancing scheme, according to the prior art.
Figures 5A, 5B, 5C, 5D:
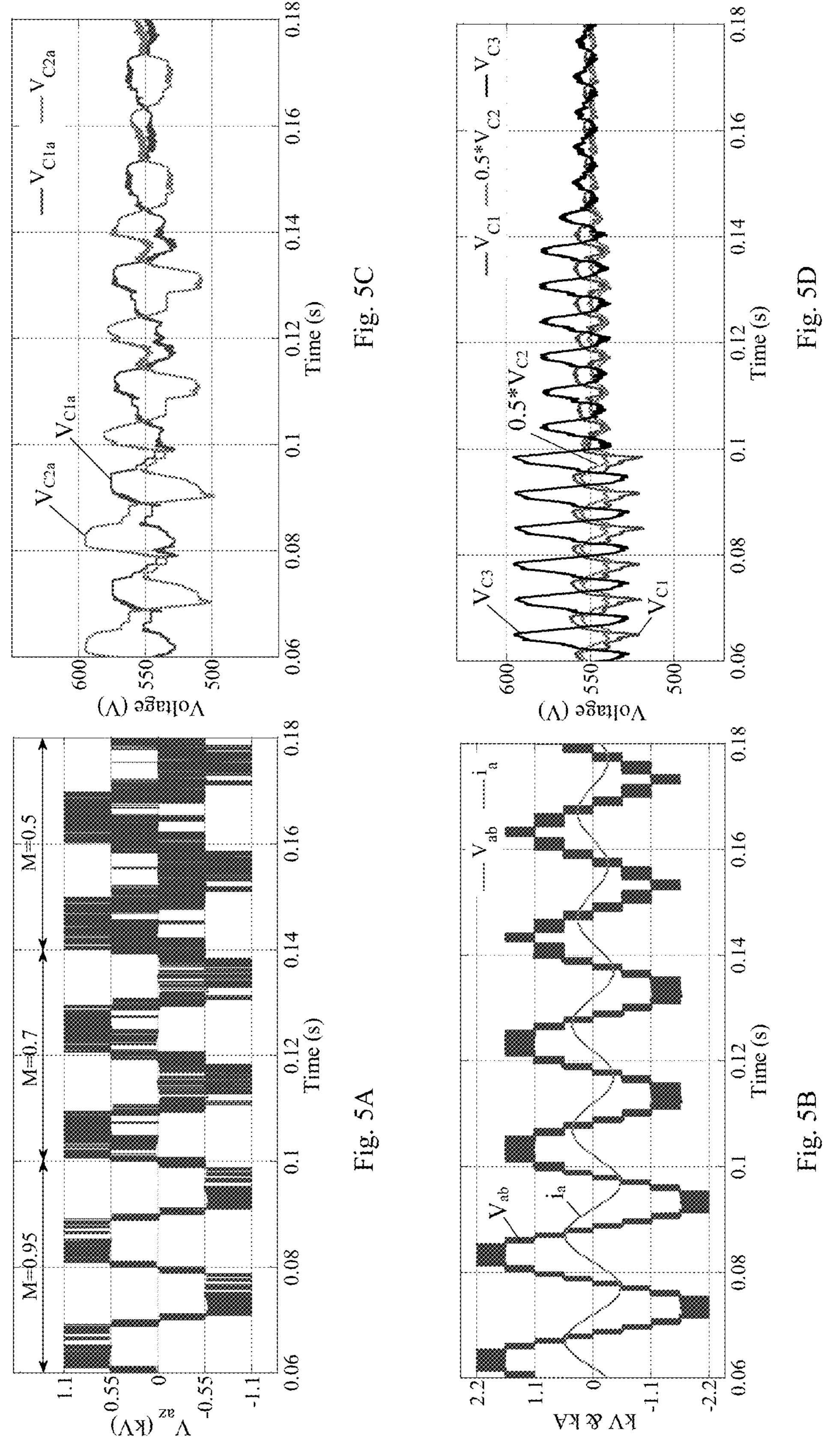
FIGS. 5A-5D show simulation results corresponding to modulation index changes for (5A) output pole voltage, (5B) output line to line voltage and current, (5C) flying capacitor voltages, and (5D) dc link split capacitor voltages, for an embodiment.
Figures 6A, 6B:
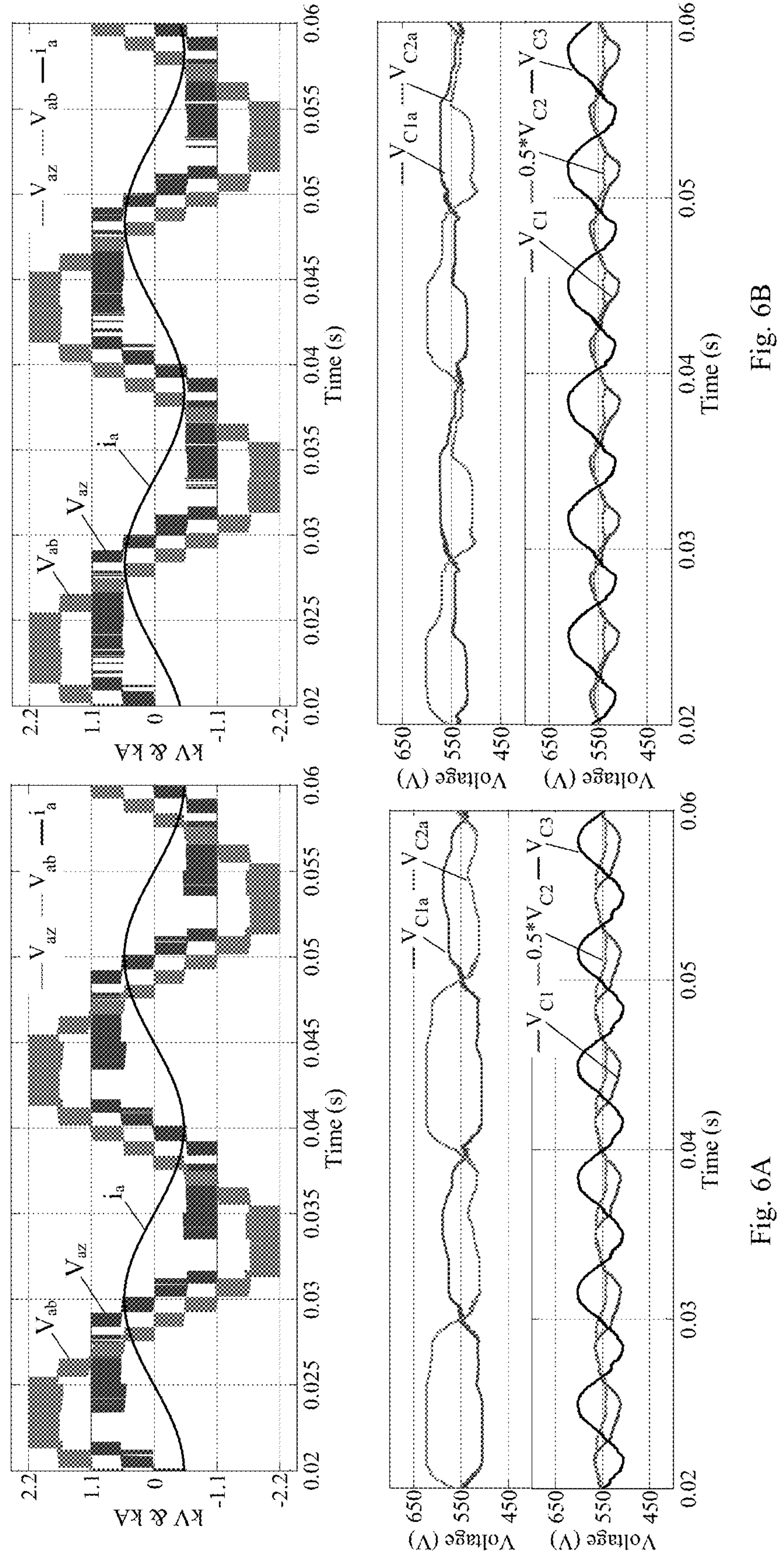
FIGS. 6A-6D show simulation results corresponding to lagging power factor (PF) for (6A) PF=0; (6B) PF=0.5; (6C) PF=0.75; (6D) PF=1, wherein upper panels are output pole voltage, line to line voltage, and output current, and lower panels are flying capacitor voltages and split capacitor voltages.
Figures 6C, 6D:
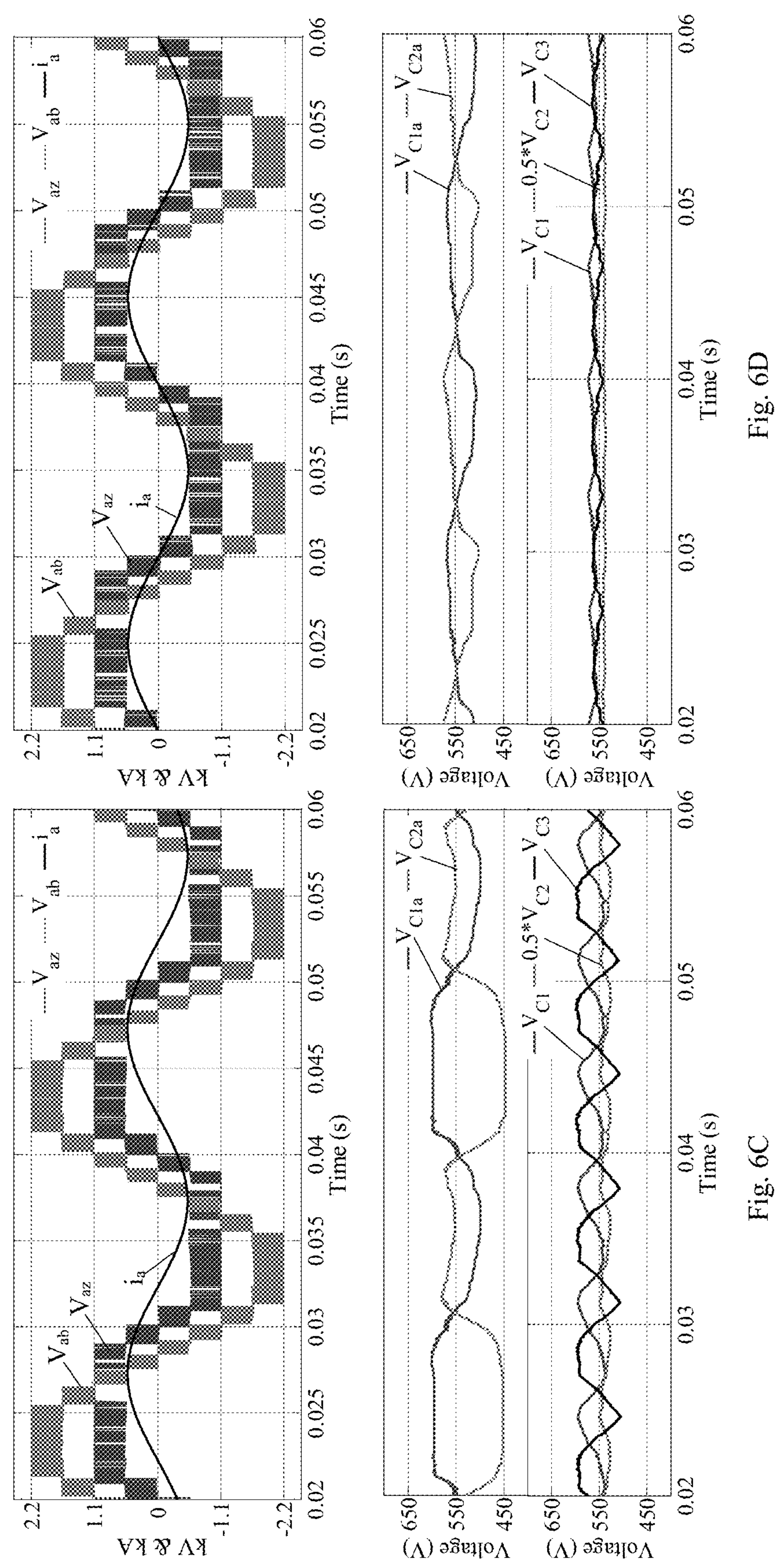

Embodiments may include a controller with power switching device drivers and logic circuitry that implements a control strategy, such as SVM, an example of which is shown in FIG. 4B. The controller may be implemented in whole or in part using discrete (e.g., analogue) components and/or using digital technology. A controller may include integrated circuit (IC) implementation, which greatly reduces component cost and design complexity. Examples of suitable digital technologies include processors such as, but not limited to, digital signal processor (DSP), field programmable gate array (FPGA), application specific integrated circuit (ASIC), and microcontroller unit (MCU). One or more components of a controller may be implemented in an algorithm using a suitable computer or hardware language (i.e., code) such as, for example, very high speed integrated circuit (VHSIC) hardware descriptive language (VHDL), register transfer language (RTL), or Verilog. Such an algorithm may be stored in a non-volatile memory of the controller and executed in, for example, a DSP, FPGA, ASIC, or MCU device of the controller.

The invention is further described by way of the following non-limiting examples. Simulations were performed using PSIM software (Powersim Inc., Troy, MI, USA).

Example 1: Comparison with Three-Phase 5L-ANPC Inverter Topology

In this example a three phase 5L-HAC embodiment is compared to a known three-phase 5L-ANPC topology as shown in FIG. 4A.

The number and type of semiconductor switches is an important parameter in a power switching converter as it directly affects the size, cost, complexity, and losses of the converter. The actual switch count in a converter depends not only on converter topology, but also on the current and voltage ratings of switches. That is, the current and voltage rating of a switch in a topology determine the actual number of semiconductor switches needed to implement that switch. The specifications of the switches used in the topologies in this comparison are listed in Table 2.

In Table 2, it is assumed that the current rating of all switches is about the same, and thus the actual number of switches is determined only based on the converter topology and the voltage rating of switches. Therefore, the total blocking voltage of switches determines the actual number of active switches employed in the converter structure. It is noted that in the 5L-HAC embodiment all the switches may have the same voltage rating, whereas in 5L-ANPC some switches have voltage rating different from others, such as twice as much as others. It can be seen from Table 2 that the 5L-HAC embodiment has a lower number of switches than the 5L-ANPC topology.

TABLE 2

Switch characteristics of 5L-ANPC converter and a 5L-HAC embodiment

| Topology | Number of Switches with Blocking Voltage of $V_{dc}/2$ | Number of Switches with Blocking Voltage of $V_{dc}/4$ | Number of switches if the Topology is Implemented using Switches with Blocking Voltages of $V_{dc}/4$ | Number of Diodes |
|---|---|---|---|---|
| 5L-ANPC | 12 | 12 | 36 | 0 |
| 5L-HAC | 0 | 30 | 30 | 6 |

The actual number of capacitor units used in a converter is determined by the number of capacitors in the topology and their voltage and current rating. Therefore, the total capacitors volt-ampere in each topology can be used as an index to get an estimate of the size of capacitors used in a converter.

The rms current of capacitors at load power factor (PF) of 0.9 were obtained using simulations on PSIM software for the two topologies. Table 3 shows the characteristics of required capacitors. The total capacitors volt-ampere is shown in the right column of Table 3. It can be seen that the total volt-ampere of capacitors in the 5L-HAC embodiment is about 20% higher than in the 5L-ANPC topology.

TABLE 3

Capacitor characteristics of a 5L-ANPC converter and a 5L-HAC embodiment

| Topology | Measured Parameters | DC Link Capacitors | Flying Capacitors (each leg) | Total (3 legs & DC link) |
|---|---|---|---|---|
| 5L-ANPC | Voltages (kV) | 2, 2 | 1 | 7 |
| | PF = 0.9 RMS Currents (A) | 35, 35 | 54 | |
| | ΣVI | 140 | 54 | 302 |
| 5L-HAC | Voltages (kV) | 1, 2, 1 | 1, 1 | 10 |
| | PF = 0.9 RMS Currents (A) | 41, 19, 41 | 39, 38 | |
| | ΣVI | 120 | 77 | 351 |

Example 2: Performance Simulation

In this example simulation results of an embodiment of the 5L-HAC topology are presented. All switches were assumed to be ideal as the scope of the simulation was to evaluate the converter performance using the space vector modulation technique and capacitor voltage balancing algorithm (see FIG. 4B). Redundant switching states provide different charging/discharging states for flying capacitors and dc-link capacitors, as shown in Table 1. This feature is exploited to achieve voltage balancing of capacitors.

Space vector modulation relies on synthesizing a reference space vector $V_{ref}$ by using the three nearest stationary vectors. Referring to FIG. 4B, the reference voltage vector determines the three adjacent voltage vectors and the corresponding redundant space vectors, RSVs, in the space vectors plan. In addition, the available redundant switching states, RSSs, of RSVs are determined. To determine the deviations of de-link and flying capacitor voltages from their rated values, the capacitor voltages in each phase and dc-link capacitor voltage are measured. The output currents are also measured to determine the sign of each phase current, and thus, the sign of current flowing through the respective capacitors. For the available RSSs of each phase voltage level, the capacitor voltage balancing algorithm uses the capacitor voltage deviations and the signs of phase currents to evaluate the RSSs, and the best switching state (BSS) is selected for each phase voltage level. After that, the available RSVs are evaluated, and the best space vector (BSV) is determined. Finally, the corresponding switching states are applied to the converter.

The parameters associated with the converters used in these simulations are listed in Table 4.

TABLE 4

System parameters for the simulation

| Parameter | Value |
|---|---|
| DC Source Voltage ($V_{dc}$) | 2200 V |
| Sampling Frequency ($f_s$) | 20 kHz |
| Capacitance of Flying Capacitors ($C_{1x}$, $C_{2x}$) | 3.3 mF, 3.3 mF |
| Capacitance of Split Capacitors ($C_1$, $C_2$, $C_3$) | 3.3 mF, 1.65 mF, 3.3 mF |
| Blocking Voltage of Switches | 550 V |
| Modulation Index | 0.95, 0.7, 0.5 |
| Load Current | 370 A |
| Load Power Factor | 0.9 |

In order to show the transient performance of the 5L-HAC embodiment, two step changes of modulation index (M) from M=0.95 to M=0.7 at t=0.1 s and to M=0.5 at t=0.14 s were applied. The output pole and line voltage, output current, flying capacitor voltages, and dc link split capacitor voltages are shown in FIGS. 5A-5D. As can be observed, the capacitor voltages remain regulated at the desired values with the modulation index variations.

Figures 7A, 7B:
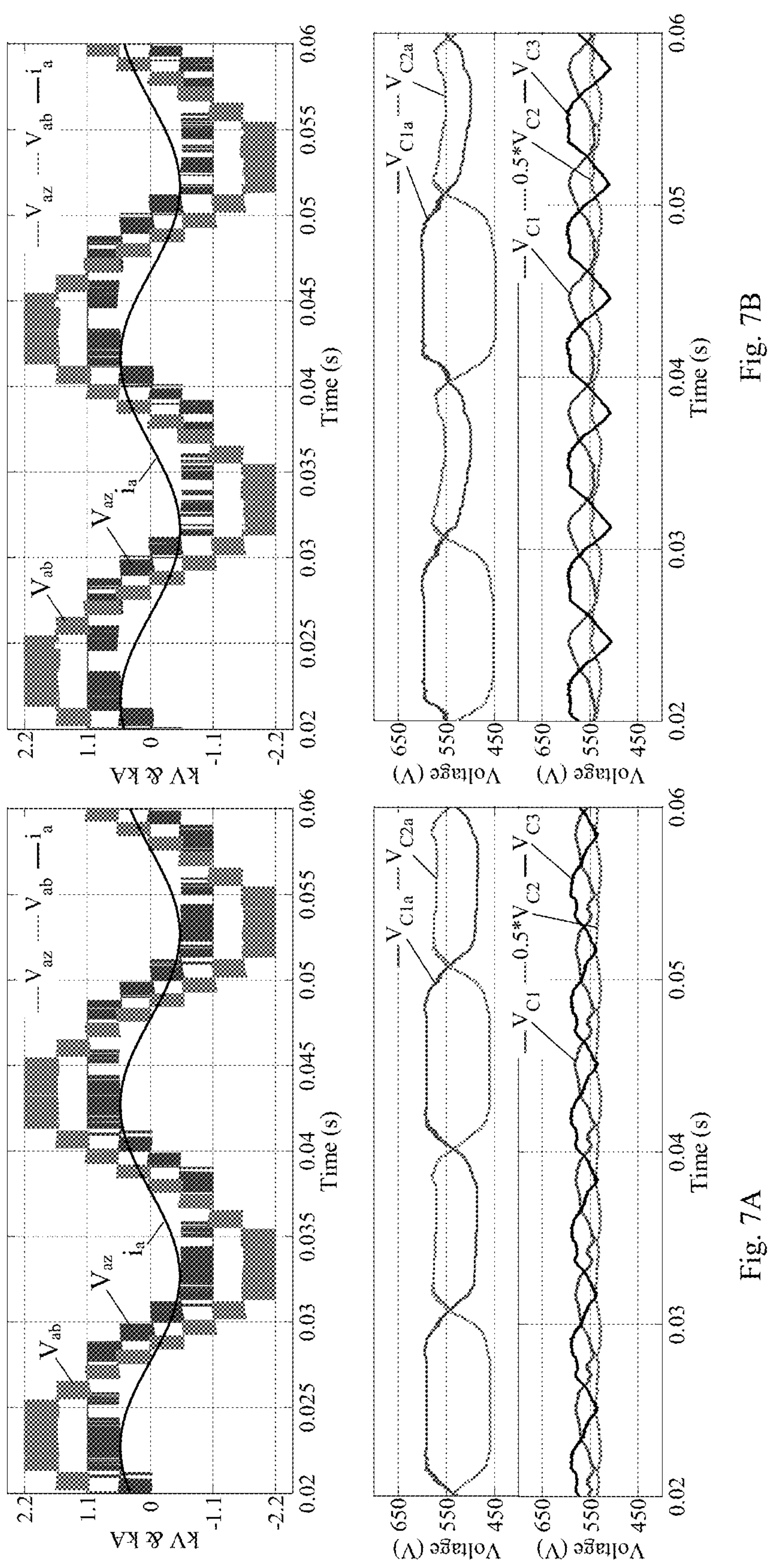
FIGS. 7A-7C show simulation results corresponding to leading PF for (7A) PF=0.75, (7B) PF=0.5, and (7C) PF=0, wherein upper panels are output pole voltage, line to line voltage and output current, and lower panels are flying capacitor voltages and split capacitor voltages)
Figure 7C:
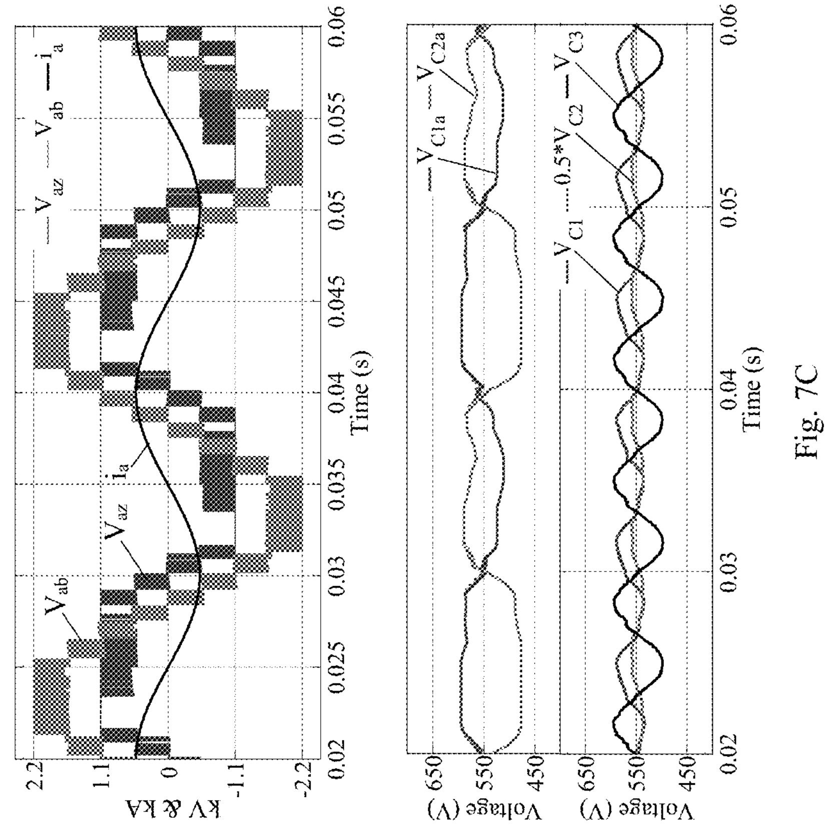

FIGS. 6A-6D show the simulation results with different lagging load PFs: PF=0, 0.5, 0.75, and 1, respectively, and FIGS. 7A-7C show the simulation results for different leading PFs: 0.75, 0.5, and 0, wherein the upper panels are output pole voltage, line to line voltage, and output current, and the lower panels are flying capacitor voltages and split capacitor voltages. From the results it can be seen that the 5L-HAC embodiment properly generates a five-level output phase voltage. The flying capacitor voltages and de link split capacitor voltages are regulated under all operating conditions.

All cited publications are incorporated herein by reference in their entirety.

EQUIVALENTS

It will be appreciated that modifications may be made to the embodiments described herein without departing from the scope of the invention. Accordingly, the invention should not be limited by the specific embodiments set forth, but should be given the broadest interpretation consistent with the teachings of the description as a whole.

The invention claimed is:

1. A five-level DC-AC converter, comprising:
- a positive DC voltage input point;
- a negative DC voltage input point;
- a circuit comprising first, second, and third capacitors (C1, C2, C3) connected across the positive and negative DC input points, wherein a first dc-link voltage is provided at a connection between the first and second capacitors (C1, C2) and the positive DC voltage input point, and a second dc-link voltage is provided at a connection between the second and third capacitors (C2, C3) and the negative DC voltage input point;
- a first circuit connected across the first dc-link voltage comprising a first switch (S1*a*) and a second switch (S1*na*) connected together at a first common point;
- a second circuit connected across the second dc-link voltage comprising a third switch (S2*a*) and a fourth switch (S2*na*) connected together at a second common point;
- a third circuit connected across the first common point and the second common point; wherein the third circuit comprises:
- fifth to tenth switches (S3*a*, S4*a*, S5*a*, S4*na*, S5*na*, S3*na*) connected together;
- at least first and second flying capacitors (C1*a*, C2*a*) connected together across a connection point between the fifth and sixth switches (S3*a*, S4*a*) and a connection point between the ninth and tenth switches (S5*na*, S3*na*);
- at least first and second diodes (D1, D2) connected together across a connection point between the sixth and seventh switches (S4*a*, S5*a*) and a connection point between the eighth and ninth switches (S4*na*, S5*na*);
- a common point between the first and second flying capacitors (C1*a*, C2*a*) connected to a common point between the first and second diodes (D1, D2);
- an output point between the seventh and eighth switches (S5*a*, S4*na*) that outputs five voltage levels; and
- a controller configured to generate switching signals for switches of the DC-AC converter by implementing a control strategy including a space vector modulation technique.

2. The five-level DC-AC converter of claim 1, wherein a blocking voltage of each switch is substantially the same.

3. The five-level DC-AC converter of claim 1, wherein a blocking voltage of each switch is approximately Vdc/4.

4. The five-level DC-AC converter of claim 1, wherein capacitor voltage is substantially balanced across all operating points of the converter.

5. The five-level DC-AC converter of claim 1, wherein the first and third capacitors (C1, C3) are substantially the same value and the second capacitor (C2) is of a smaller value than the first or third capacitors (C1 or C3).

6. The five-level DC-AC converter of claim 1, wherein the switching signals control switching states of the switches to regulate capacitor voltages under all operating conditions of the DC-AC converter and to generate the five output voltage levels.

7. The five-level DC-AC converter of claim 1, wherein the switching states include redundant switching states.

8. The five-level DC-AC converter of claim 7, wherein the controller evaluates voltage deviations of the dc-link capacitors and the flying capacitors, and selects among the redundant switching states based on the evaluated voltage deviations to simultaneously regulate voltages of the dc-link capacitors and the flying capacitors.

9. The five-level DC-AC converter of claim 1 implemented in a DC-AC grid-tie converter.

10. A DC-AC grid-tie converter comprising the five-level DC-AC converter of claim 1.

11. A three-phase five-level DC-AC converter, comprising:
- a positive DC voltage input point;
- a negative DC voltage input point;
- a circuit comprising first, second, and third capacitors (C1, C2, C3) connected across the positive and negative DC input points, wherein a first dc-link voltage is provided at a connection between the first and second capacitors (C1, C2) and the positive DC voltage input point, and a second dc-link voltage is provided at a connection between the second and third capacitors (C2, C3) and the negative DC voltage input point;
- wherein each phase of the three-phase converter comprises:
- a first circuit connected across the first dc-link voltage comprising a first switch (S1*a*) and a second switch (S1*na*) connected together at a first common point;
- a second circuit connected across the second dc-link voltage comprising a third switch (S2*a*) and a fourth switch (S2*na*) connected together at a second common point;
- a third circuit connected across the first common point and the second common point; wherein the third circuit comprises:
- fifth to tenth switches (S3*a*, S4*a*, S5*a*, S4*na*, S5*na*, S3*na*) connected together;
- at least first and second flying capacitors (C1*a*, C2*a*) connected together across a connection point between the fifth and sixth switches (S3*a*, S4*a*) and a connection point between the ninth and tenth switches (S5*na*, S3*na*);
- at least first and second diodes (D1, D2) connected together across a connection point between the sixth and seventh switches (S4a, S5a) and a connection point between the eighth and ninth switches (S4na, S5na);

a common point between the first and second flying capacitors (C1a, C2a) connected to a common point between the first and second diodes (D1, D2); and an output point between the seventh and eighth switches (S5a, S4na) that outputs five voltage levels corresponding to one of the three phases;

wherein the three-phase five-level DC-AC converter comprises a controller configured to generate switching signals for switches of the three phases by implementing a control strategy including a space vector modulation technique.

12. A DC-AC grid-tie converter comprising the five-level three-phase DC-AC converter of claim 11.

13. The three-phase five-level DC-AC converter of claim 11, wherein the switching signals control switching states of the switches to regulate capacitor voltages under all operating conditions of the DC-AC converter and to generate the five output voltage levels of the three phases.

14. The three-phase five-level DC-AC converter of claim 11, wherein the switching states include redundant switching states.

15. The three-phase five-level DC-AC converter of claim 14, wherein the controller evaluates voltage deviations of the dc-link capacitors and the flying capacitors, and selects among the redundant switching states based on the evaluated voltage deviations to simultaneously regulate voltages of the dc-link capacitors and the flying capacitors.

* * * * *